United States Patent [19]

Kempf

[11] 4,276,398
[45] Jun. 30, 1981

[54] METHOD OF RECOVERING ENERGY IN THE MANUFACTURE OF POLYMERS FROM MONOMERIC GAS AND APPARATUS FOR CARRYING OUT THE METHOD

[76] Inventor: Jacques G. Kempf, Schafmattweg 55, CH-4102 Binningen, Switzerland

[21] Appl. No.: 76,651

[22] Filed: Sep. 18, 1979

[30] Foreign Application Priority Data

Sep. 20, 1978 [CH] Switzerland .......................... 9825/78

[51] Int. Cl.³ ............................................. C08F 2/34
[52] U.S. Cl. ..................................... 526/68; 422/138
[58] Field of Search ......................................... 526/68

Primary Examiner—Stanford M. Levin
Attorney, Agent, or Firm—Neil F. Markva

[57] ABSTRACT

In a method of recovering energy in the manufacture of high-pressure polyethylene from ethylene gas, the ethylene gas is compressed and partially converted into polyethylene in a reactor by polymerization. For the purpose of energy recovery, the polymer-gas mixture being discharged from the reactor is accelerated and decompressed in a nozzle system of an energy exchange unit, mixed and compressed with an almost polymer-free working stream. The polymer-free gas is then separated in a separation. The working stream flows through a decompression turbine, and is subsequently conveyed together with the polymer-gas mixture from the reactor into the nozzle system of the energy exchange unit and is continuously re-compressed in the energy exchange unit by the gas stream from the decompression turbine.

9 Claims, 4 Drawing Figures

METHOD OF RECOVERING ENERGY IN THE MANUFACTURE OF POLYMERS FROM MONOMERIC GAS AND APPARATUS FOR CARRYING OUT THE METHOD

BACKGROUND OF THE INVENTION

This invention relates to a method of and an apparatus for recovering energy in the manufacture of polymers, in particular high-pressure polyethylene, from monomeric gas, in which the monomeric gas is compressed and partially converted into a polymer in a reactor by polymerization.

The invention relates in particular to the use of this energy recovery method in the manufacture of polyethylene from ethylene monomeric gas by means of the high pressure method.

In this known high-pressure method the ethylene gas is compressed to high pressures (1000–3000 bar and more), in which only a moderate proportion of this monomeric gas is converted into polyethylene by polymerization in a reactor. The much larger proportion of non-reacted gas is re-circulated uneconomically and with a high energy consumption into a compression and decompression circuit; thus there is considerable energy consumption taking into account the moderate amounts of polyethylene obtained.

The known high-pressure method for the manufacture of polyethylene from monomeric gas takes place basically as illustrated in FIG. 1 of the accompanying drawings.

In the manufacture of polyethylene using the high pressure method, ethylene gas, $C_2H_4$, supplied via a pipe 24 is compressed in stages to high pressures (1000–3000 bar and more according to the properties of the product required). The compression is carried out in a piston compressor S.

The high-pressure gas (stream m) subsequently flows into a reactor R, in which polymerization takes place by the injection of a catalyst. Only quite a small proportion (approximately 18–25%) of the total gas volume m in the reactor is converted into polymer and polyethylene. The remaining larger proportion which is unreacted remains as ethylene monomeric gas, which is linked to the polymer in a type of two-phase solution.

Under these high pressure and temperature conditions, at which the product is discharged from the reactor R into a pipe 1, it is not possible to separate the polymer and the ethylene gas.

To separate the polymer from the monomeric gas, the material stream m (polymer+monomeric gas) is decompressed by a choke valve 2 to a much lower separation pressure (approximately 250–300 bar). In a medium-pressure separator A. A considerable proportion of the amount of bonded ethylene gas is released (approximately 70% of m).

The separated, almost polymer-free monomeric gas (amount m-$m_o$) is added to the ethylene gas (amount $m_o$) to form the total stream m. The ethylene gas (amount $m_o$) has been compressed by a primary compressor P to the separation pressure in the separator A. This gas volume m is compressed by the secondary compressor S to the reactor pressure and the process is re-started (high-pressure circuit R-1-2-A-24-S-R).

Therefore a large proportion of non-polymerized ethylene gas, in effect 3 to 4 times the amount of polymer obtained, is re-circulated in the high-pressure circuit.

The corresponding energy consumption for the compression, cooling and other processes is enormous in comparison with the moderate yields of polyethylene. In effect, the polyethylene obtained only corresponds to 18–25% of the total energy consumption. Most of the energy is used to re-compress the monomeric gas which has not been converted into polymer to the reactor pressure at the compressor S. Therefore the energy content of the material stream m is again lost without being used during the choking at the valve 2.

In this respect, the choking at valve 2 again effects an increase in the temperature of the material stream m causing a detrimental effect on the separability of the polymer and monomer. This requires cooling and corresponding expenditure of more energy.

The polymer in the medium-pressure separator A remains bonded to approximately 10% of the monomer gas. The amount $m_o$ (polymer+monomeric residual gas) of the stream of material discharged into a pipe 11 is further decompressed to a low separation temperature in a low-pressure separator A' via a choke valve 12. The degasified polyethylene (amount $m_p$), discharged through a pipe 21, is suitable for further processing.

The separated residual ethylene gas in an amount $m_o-m_p$ is mixed with freshly supplied ethylene gas (amount $m_f=m_p$) (Process A'-/22–23) and compressed by the primary compressor P to the pressure in the pipe 24. This gas volume $m_o$ (approximately 30% of the amount m) is mixed at 24 with the monomeric gas from the separator A to obtain the total amount m.

The low-pressure process (11-12-A'-23-P-24) includes a further expenditure of energy caused by the energy loss resulting from the choking at valves 2 and 12, because the proportion of residual gas must also be recompressed from the low pressure at the separator A' to the reactor pressure by compressors P and S. The material stream is heated by the choking at valve 12, having the effects discussed above.

The manufacture of polyethylene by the high-pressure method is therefore carried out with an unsuitable degree of energy consumption, the particular causes of which are as follows:

the polymerization process takes place at high pressures with considerable energy expenditure;

the amount of polyethylene which is obtained from the entire gas volume m used in the process is quite small;

the polymer and monomeric gas are not separable at high pressures and temperatures and it is exactly at this point that the complete energy content (in the line 1) is present;

the necessity of decompressing the material stream m to low pressures to separate the polymer and the monomeric gas;

this decompression is carried out with choke valves (2,12) and the stored energy is unused and therefore lost;

the material stream is heated by the choking at the valves 2 and 12, which makes separability at higher pressures more difficult and necessitates additional cooling energy.

SUMMARY OF THE INVENTION

It is therefore an object of the present invention to provide a method for recovering energy in the high pressure method of manufacturing polymers, in particular polyethylene. The energy contained in the material stream m being discharged from reactor R is to be recovered, instead of being dissipated during the choking. A working stream m' of ethylene gas is used to improve the overall degree of efficiency of the method. This working stream m', separate from the polyethylene, acts on an energy recovery unit such as a decompression turbine as a quasi pure gas with a negligible proportion of polymer.

It is another object of the invention to provide an apparatus suitable for carrying out such an improved method.

The present invention in one aspect provides a method of recovering energy in the manufacture of polymers from monomeric gas, comprising compressing and partially converting the monomeric gas into a polymer in a reactor by polymerization. The polymer-gas mixture being discharged from the reactor is accelerated and decompressed in a nozzle system of an energy exchange unit. The stream of said polymer-gas mixture in the energy exchange unit is mixed with an almost polymer-free working stream of the same monomeric gas under simultaneous compression. The almost polymer-free monomeric gas of the working stream is separated from the mixture in a separator and passed in a separate circuit after passing through the separator. The working stream in the separate circuit is conveyed to a decompression means and decompressed therein by energy release. After being discharged, the working stream is conveyed from the decompression unit into the energy exchange unit to the region of the nozzle system of the energy exchange unit. The polymer-gas mixture from the reactor and the working stream from the decompression means is conveyed together in the region of the nozzle system, wherein the working gas stream is continuously re-compressed in the energy exchange unit to the pressure in the separator.

The invention in another aspect provides apparatus for recovering energy in the manufacture of polymers. The apparatus comprises means for partially converting monomeric gas into polymer by polymerization in a polymerization zone, means for accelerating and decompressing the discharge stream of a first mixture of polymer-gas being discharged from the converting means, means for mixing the discharge stream of the first mixture in an energy exchange zone with an almost polymer-free working stream of the same gas to form a second mixture under simultaneous compression. The almost polymer-free gas from the second mixture is separated by separating means to form said working stream. Decompressing means is used to decompress the working stream by energy release. Means are provided for conveying the working stream after being discharged from the decompression zone into the energy exchange zone whereby the working gas stream is continuously re-compressed in the energy exchange zone to the pressure of the separating zone.

BRIEF DESCRIPTION OF DRAWINGS

The invention will be further described, by way of example only, with reference to the accompanying drawings, in which.

DETAILED DESCRIPTION

Figure 1:
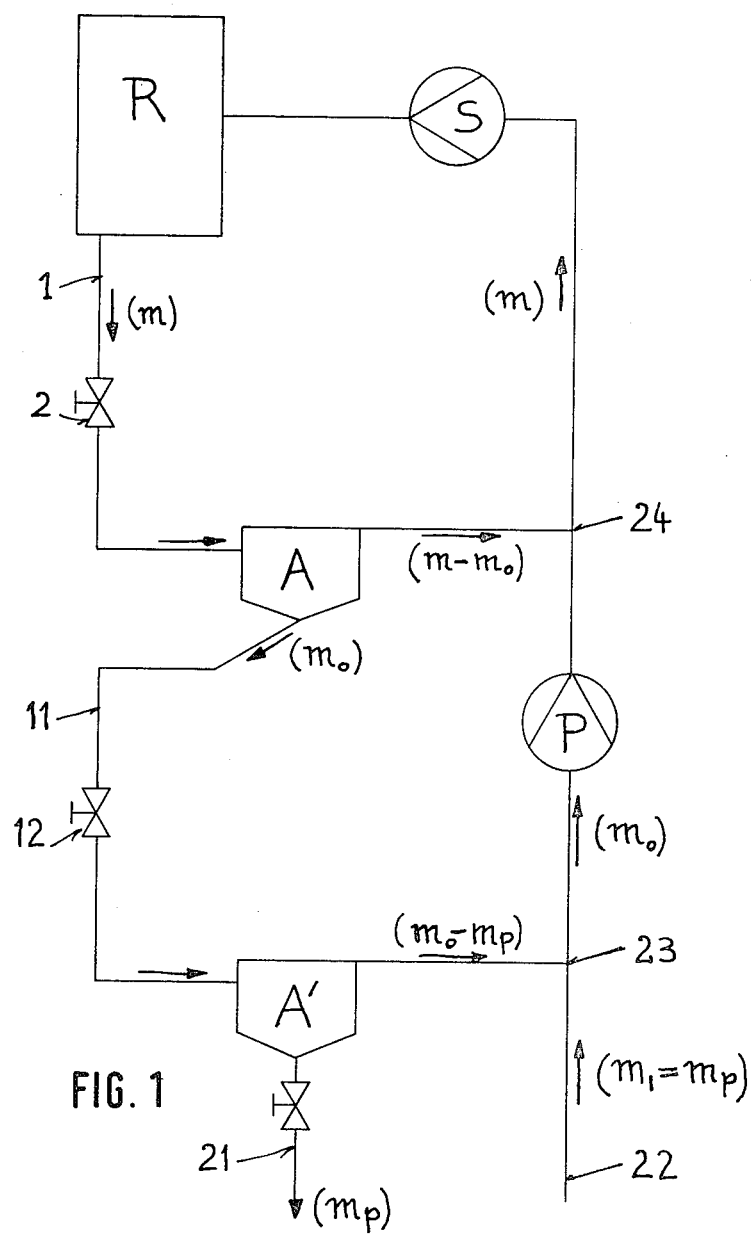
Figure 2:
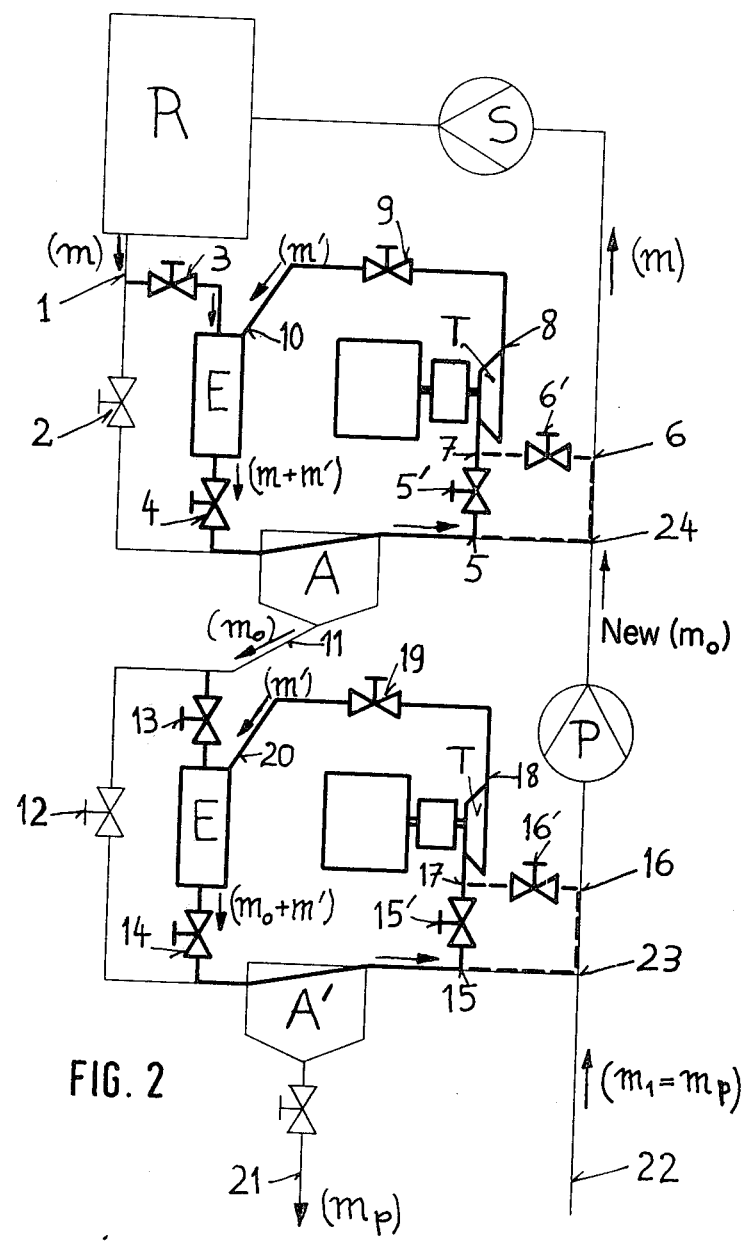
FIG. 2 is a schematic illustration of one embodiment of the method according to the invention.

The following description refers to FIG. 2 and uses the reference numerals already shown in FIG. 1 and relates in particular to the energy recovery principle in the high-pressure circuit (R-1-A-24-S-R) between reactor R and medium-pressure separator A.

The full reaction pressure (approximately 2000 bar) is contained in pipe 1. Valves 3 and 4 are completely open or in a slightly closed position for the purpose of regulation. The valve 2 is in principle closed, but may be used for certain regulation purposes if slightly open.

Figure 3:
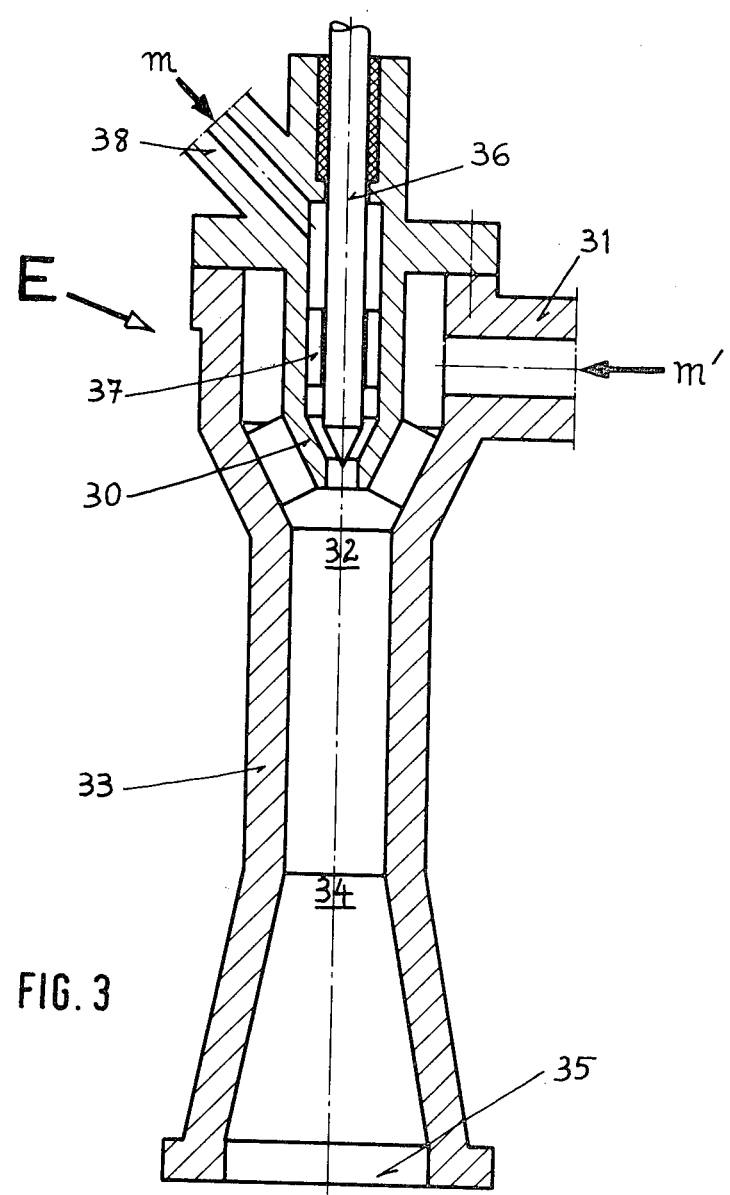
FIG. 3 is a sectional representation of an energy exchange unit having a nozzle system used in the method of the invention.

The energy exchange unit E having an adjustable nozzle system shown in FIG. 3 includes a known decompression nozzle 30 having a regulating needle 36 and a needle seat 37, a housing 33, an inlet 38 for the material stream m, an inlet 31 for the material stream m' and an outlet 35.

A high-pressure material stream in an amount m=20 kp/sec. (polymer+ethylene monomeric gas) is introduced into energy exchange unit E and accelerated almost without loss to maximum speed in nozzle 30, wherein the static pressure of 2000 bar decreases to a final value at a zone 32 of approximately 100 bar. The nozzle system is adjustable and is adapted to the flow process of a two-phase flow of polymer+monomeric gas.

The material stream m=20 kp/sec flows from the nozzle into housing 33 of suitable shape and construction. As a result of its momentum stream m effects a suction effect on the secondary material stream or working stream m'=60 kp/sec in a pipe 10 of the energy recovery circuit (3-E-4-A-/5 or 6/-7-8-9-10). The working stream m' consists of quasi pure ethylene gas.

The pressure of working stream m' before entry into energy exchange unit E through pipes 8 to 10, i.e. 180 bar, is smaller than the separation pressure in separator A, i.e. 300 bar. In energy exchange unit E, stream m' is accelerated via the inlet 31 to the zone 32 thereby decreasing static pressure at zone 32 from 180 bar to approximately 100 bar. Both streams m and m' meet at zone 32 with subsequent mixing during passage to zone 34 and compression in the section 32-34-35 from 100 to 300 bar.

A considerable amount of the stored energy in stream m is transferred to stream m' in energy exchange unit E. Consequently, the energy content of working stream m' is increased from the lower value of 180 bar in pipes 8 to 10 to the higher value of 300 bar at outlet 35. The quantity ratio m':m=3 is in an optimum energetic ratio in energy exchange unit E with a degree of compression of the stream m' of 300:180=1.67. Thus, the energy exchange m to m' and consequently the operational capacity and operational utilization of the stream m' are maximized.

The mixture m+m'=80 kp/sec flows from energy exchange unit E into medium-pressure separator A where a substantial proportion of ethylene monomeric gas is released: the working stream m'=60 kp/sec plus a gas volume (14 kp/sec), corresponding to 70% of the volume of the stream m. There remains in the pipe 11 a volume $m_o$=6 kp/sec, consisting of a small portion of non-separable residual gas (2 kp/sec, quantitatively 10% of m)+polymer (4 kp/sec).

The separated monomeric gas in a volume $m' + (m - m_o) = 74$ kp/sec is discharged from the separator A as quasi pure ethylene gas (Process A-5).

New ethylene gas $m_o = 6$ kp/sec from the primary compressor P flows in at position 24. This gas supply renews the material volume $m_o = 6$ kp/sec (polymer + residual gas) discharged via the pipe 11.

The re-completed ethylene gas volume $m = 60$ kp/sec at a position 6 is conveyed to the high-pressure secondary compressor S and is compressed to the reactor pressure (Process 24-S-R).

In contrast the proportion corresponding to the almost polymer-free working stream $m' = 60$ kp/sec, flows into the separate circuit of the energy recovery system (Process A-5-7 or A-5-24-6-7). Here, the working stream $m'$ releases the energy acquired in the energy exchange unit E to an energy-evaluation unit (process 7-8) comprising a radial or axial decompression turbine T which drives an electric generator, a compressor or the like with a drive gear unit. The power supplied by turbine T is lastly converted into utilizable energy. The pressure of the working stream $m'$ decreases from the output value of about 300 bar at 7 to the lower value of about 100 bar at 8. Following this, the energy recovery circuit process is repeated (3-E/10-E/-4-A-5-7 or 5-24-6-7/8-9-10).

Thus, the principle of the energy recovery system and the function of the working stream $m'$ is as follows:

the energy content in pipe 1 of material stream $m$ (polymer + monomeric gas) is recovered and transferred to the secondary working stream $m'$ of quasi pure ethylene gas;

the ethylene volume $m'$ is separated in a separator A from the mixture $m + m'$;

this ethylene volume $m'$ is conveyed as the working stream (almost polymer-free) into a separate energy recovery circuit (Process A-5-7 or A-24-6-7);

the energy acquired from working stream $m'$ in the energy exchange unit E is released to an energy evaluation unit T, thereby transferring the power from stream $m$ to the unit T which produces utilizable energy;

an almost polymer-free gas stream or ethylene stream $m'$ is used as the energy carrier and decompression agent in unit T. The decompression of the material stream $m$ (polymer + monomeric gas) in Unit T would lead to problems and a low degree of efficiency on account of the polymer.

In addition to optimum energy recovery, the energy recovery system of this invention has further uses as a cooling circuit. In the known procedure without energy recovery, decompression by choking in valve 2 leads to a heating of the material stream $m$. However, with the energy recovery system, the material stream $m$ is substantially cooled without additional energy consumption:

(a) During the almost loss-free acceleration in the nozzle system of the energy exchange unit E, the material stream $m$ is cooled.

(b) As a result of the optimum decompression in the turbine T, the working stream $m'$ undergoes a substantial temperature decrease. The cooling energy of the stream $m'$ which thereby becomes available effects a further cooling of the material stream $m$ (polymer + monomeric gas).

(c) The mixing and compression process in the energy exchange unit E leads to a moderate temperature increase in the mixture $m + m'$. On the whole, however, a substantial cooling is recorded.

This cooling favors the separation of ethylene gas and polymer at the given separator pressure. This separation pressure could thereby be increased with uniform amounts of separated ethylene gas. By increasing the pressure in the separator A the compression output of the compressor S is smaller.

The energy recovery system may be used at the different polymerization pressures and volumes of the stream $m$ required by manufacturing processes.

The energy recovery system is respectively actuated or stopped by means of the valves 3, 4, 5' or 6' (FIG. 2). In the closed positions of these valves the energy system is not operative.

A plant may be operated in accordance with the known procedure without energy recovery. After the plant has been set up, the energy recovery system may be brought into operation, but does not necessarily have to be.

Figure 4:
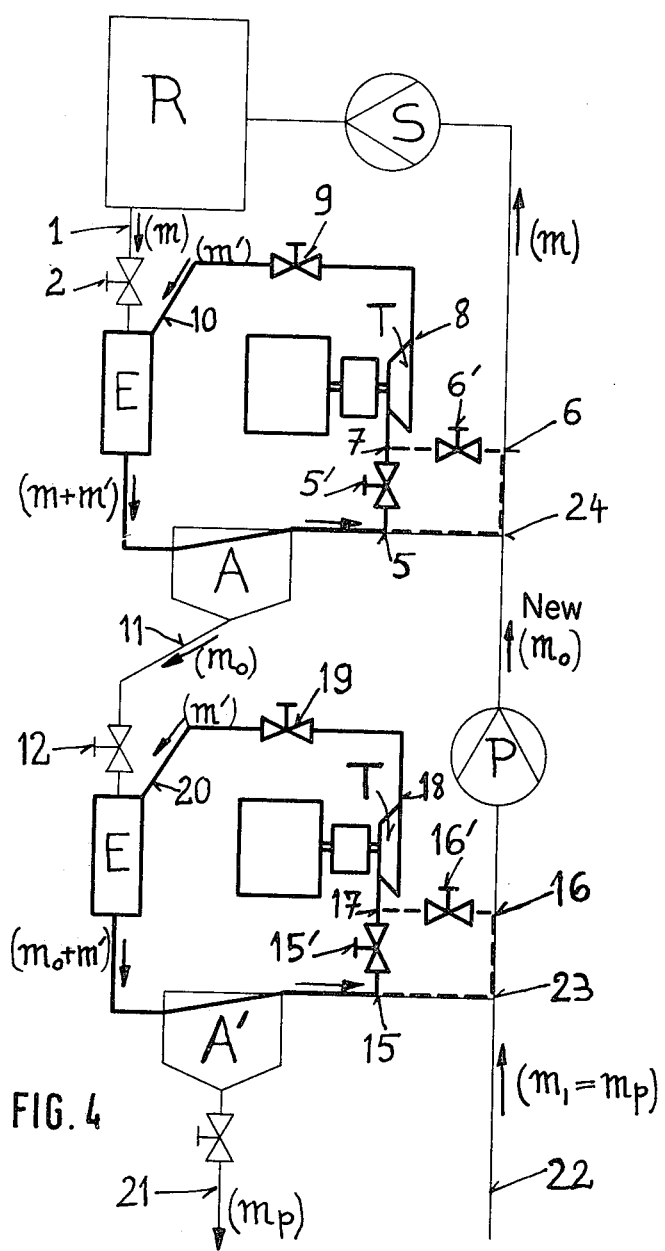
FIG. 4 is a schematic illustration of a variant of the method according to the invention.

A variant of this method is shown in FIG. 4.

The energy recovery system may also be integrated into the known manufacturing process of FIG. 1 in accordance with the procedure (E-A/5 or 6/7-8-10) of FIG. 4.

In this case the flow of the stream $m$ always passes through the energy exchange unit E (Process 1-2-E-A) both with the use of and without the use of the energy recovery system.

The energy recovery system is actuated and stopped by valves 9, 5' or 6'. If the system is not in use (valves 9, 5' or 6' closed), the flow passes through the energy exchange unit E unaffected ($m' = o$). The decompression of the stream $m$ (Process 1-A) is carried out by valve 2, in the open position of the nozzle 30 of the unit E; this decompression may also be carried out by nozzle 30 of the unit E with valve 2 open or omitted.

The principle, operation and use of the energy recovery system are then substantially as for that of FIG. 2.

The energy recovery system may be integrated into the high-pressure (R-1-2-A-24-S-R) and the low-pressure (11-12-A'-23-P-24) procedure (see FIGS. 2 and 4).

In the low-pressure procedure, the energy recovery system is defined by the sequence E-A'-15 or 16/-17-18-19-20. The material volume $m_o = 6$ kp/sec (in the line 11) consists in this case of the polymer (4 kp/sec) plus the ethylene residual gas (2 kp/sec) which is still linked. The principle, operation and use of the recovery system are the same as described above for the high-pressure circuit.

The following arrangements of the two energy evaluation units T are possible for both the energy recovery system in the high-pressure and the low-pressure procedures:

(a) both decompression turbines are disposed on the same shaft and drive an electro-generator, compressor or the like via gear drives;

(b) each turbine is separate, wherein both drive only one electro-generator, compressor or the like via a gear drive;

(c) each energy evaluation unit T forms a machine system which is complete per se.

I claim:

1. A method of recovering energy in the manufacture of polymers from monomeric gas, said method comprising:

(a) compressing and partially converting the monomeric gas into a polymer in a reactor by polymerization, (b) accelerating and decompressing the polymer-gas mixture being discharged from the reactor in a nozzle system of an energy exchange unit, (c) mixing the stream of said polymer-gas mixture in the energy exchange unit with an almost polymer-free working stream of the same gas under simultaneous compression, (d) separating the almost polymer-free gas of the working stream from the mixture in a separator and passing it in a separate circuit after passing through the separator, (e) conveying the working stream in the separate circuit to a decompression means and decompressing it therein by energy release, (f) conveying the working stream after being discharged from the decompression unit into the energy exchange unit to the region of the nozzle system of the energy exchange unit, and (g) in the region of the nozzle system conveying together the polymer-gas mixture from the reactor and the working stream from the decompression means, wherein the working gas stream is continuously re-compressed in the energy exchange unit to the pressure in the separator.

2. A method as claimed in claim 1, wherein the energy exchange unit is connected directly in the connection pipe between the reactor and the separator.

3. A method as claimed in claim 1, wherein the energy exchange unit is connected in a connection pipe between two separators.

4. A method as claimed in claim 1, wherein the energy exchange unit is connected in parallel between the reactor and the separator.

5. A method as claimed in claim 1, wherein the energy exchange unit is connected in parallel between two separators.

6. A method as claimed in claim 1, wherein both the stream of material accelerated in the nozzle system of the energy exchange unit and the working stream decompressed in the decompression means are subject to smaller energy losses to cooling as a result of the acceleration and decompression, and the working stream additionally cools the polymer-gas mixture coming from the reactor by mixing in the energy exchange unit.

7. A method as claimed in claim 1, wherein the decompression means is a decompression turbine.

8. A method as claimed in claim 1 of recovering energy in the manufacture of polyethylene from ethylene gas.

9. A method of recovering energy in the manufacture of polymers from monomeric gas, said method comprising:

(a) partially converting the monomeric gas into a polymer in a polymerization zone, (b) accelerating and decompressing the discharge stream of a first mixture of polymer and gas being discharged from the polymerization zone, (c) mixing the discharge stream of the first mixture in an energy exchange zone with an almost polymer-free working stream of the same gas to form a second mixture under simultaneous compression, (d) separating the almost polymer-free gas from the second mixture in a separating zone to form said working stream, (e) decompressing said working stream in a decompression zone by energy release, and (f) conveying the working stream after being discharged from the decompression zone into the energy exchange zone whereby the working gas stream is continuously re-compressed in the energy exchange zone to the pressure of the separating zone.

* * * * *